US007346808B2

(12) United States Patent
Srinivasan et al.

(10) Patent No.: US 7,346,808 B2
(45) Date of Patent: Mar. 18, 2008

(54) DIAGNOSTIC METHOD, SYSTEM, AND PROGRAM THAT ISOLATES AND RESOLVES PARTNERSHIP PROBLEMS BETWEEN A PORTABLE DEVICE AND A HOST COMPUTER

(75) Inventors: Karamadai Srinivasan, Rocklin, CA (US); Thomas M. Tripp, Eldorado Hills, CA (US); Rajpal Gill, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 514 days.

(21) Appl. No.: 10/864,728

(22) Filed: Jun. 9, 2004

(65) Prior Publication Data
US 2005/0278569 A1 Dec. 15, 2005

(51) Int. Cl.
*G06F 11/00* (2006.01)
(52) U.S. Cl. .................. 714/27; 714/43; 709/227
(58) Field of Classification Search .................. 714/27, 714/43, 44; 702/122
See application file for complete search history.

(56) References Cited

U.S. PATENT DOCUMENTS

| | | | |
|---|---|---|---|
| 5,557,740 A | | 9/1996 | Johnson et al. |
| 5,951,697 A * | | 9/1999 | O'Donnell et al. ............ 714/37 |
| 6,243,833 B1 | | 6/2001 | Hitchcock et al. |
| 6,434,616 B2 | | 8/2002 | Urano et al. |
| 6,480,801 B2 * | | 11/2002 | Chew ........................ 702/122 |
| 6,538,996 B1 | | 3/2003 | West et al. |
| 6,539,499 B1 | | 3/2003 | Stedman et al. |
| 6,584,502 B1 | | 6/2003 | Natarajan et al. |
| 6,598,179 B1 | | 7/2003 | Chirashnya et al. |
| 6,754,844 B1 * | | 6/2004 | Mitchell ........................ 714/4 |
| 6,859,783 B2 | | 2/2005 | Cogger et al. |
| 6,950,964 B1 | | 9/2005 | McMichael et al. |
| 6,990,602 B1 * | | 1/2006 | Skinner et al. ................ 714/4 |
| 7,028,308 B2 * | | 4/2006 | Kim ........................... 719/321 |
| 7,047,442 B2 * | | 5/2006 | Sutton ........................ 714/25 |
| 7,127,506 B1 * | | 10/2006 | Schmidt et al. ............. 709/224 |
| 2002/0010803 A1 | | 1/2002 | Oberstein et al. |
| 2002/0059310 A1 | | 5/2002 | Choi |
| 2002/0067504 A1 | | 6/2002 | Salgado et al. |
| 2002/0152430 A1 | | 10/2002 | Akasaka et al. |
| 2003/0037288 A1 | | 2/2003 | Harper et al. |
| 2003/0229406 A1 | | 12/2003 | Maity |
| 2004/0098714 A1 | | 5/2004 | Metz |
| 2004/0122940 A1 | | 6/2004 | Gibson et al. |
| 2004/0123188 A1 | | 6/2004 | Srinivasan et al. |
| 2004/0236991 A1 * | | 11/2004 | Brundridge et al. .......... 714/25 |

OTHER PUBLICATIONS

Microsoft Press Computer Dictionary, 1997, Microsoft Press, Third Edition, pp. 160 and 510.*
Module 1: Overview of Microsoft Cluster Server, http://home18.inet.tele.dk/flw/MScluster.htm.*

* cited by examiner

*Primary Examiner*—Marc Duncan

(57) ABSTRACT

An automated method, system, and computer program for troubleshooting the inability of programs installed upon two computers interconnected by wired or wireless linkages to share or manipulate sharable information includes the following steps: On a first computer, tests are performed to see if hardware or software elements on that computer and essential to sharing or manipulating sharable information is properly installed or configured and also to see if information can actually be sent between the two computers; then, if possible, testing is initiated or performed to see if hardware or software elements on the second computer essential to sharing or manipulating sharable information are also properly installed or configured; and then the results of this testing is reported.

27 Claims, 6 Drawing Sheets

FIG. 6

PRELIMINARY DIAGNOSTIC REPORT

Checking Synchronization Program Installation.
  ✓ Synchronization program installation and version checked.

Checking USB/Serial port connectivity.
  ✓ Device connectivity test passed.

Checking Synchronization Program Event Settings.
  ✓ Synchronization settings are ok.

Checking Device partnership.
  ◇ The portable device is connected to the host as a guest user. This will not allow you to synchronize your portable device with your host applications.

Checking Application Synchronization Settings.
  ◇ Synchronization is disabled for the following applications: Notes. You can enable the Synchronization Program to synchronize these applications in the menu under "Tools" in the Synchronization Program's console.

Checking Communication Between the Host and the Portable Device.
  ✓ Communication program passed.

Checking the Portable Device Power Supply Status.
  ✓ The portable device is connected to an external power source.
  ✓ The battery charge status is ok.

The Preliminary Diagnostics Is Comlete.

Support Options
Select an option to proceed.
  >> view solutions to common problems for the portable device Model ABCD.
  >> install and run hardware diagnostics on the portable device.
  >> active chat - Communicate online with a support specialist.

DIAGNOSTIC METHOD, SYSTEM, AND PROGRAM THAT ISOLATES AND RESOLVES PARTNERSHIP PROBLEMS BETWEEN A PORTABLE DEVICE AND A HOST COMPUTER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

COMPUTER PROGRAM LISTING CD-R APPENDIX

This specification includes, and hereby incorporates by reference for all purposes, a CD-R Program Listing Appendix which resides on a "Compact Disc-Recordable" (or "CD-R"). Two copies (respectively labeled "COPY 1" and "COPY 2") of this CD-R were filed simultaneously with the printed portions of this specification. Here is a listing of the source code program file contents of this CD-R:

FORMAT: IBM-PC
OPERATING SYSTEM COMPATIBILITY: MS-Windows (XP)

| FILE NAME | SIZE | TYPE | CREATION DATE |
|---|---|---|---|
| asyncdiag_cpp.txt | 16,397 | Text Document | May 2, 2004 5:19:26 PM |
| (contains all of the portable device API routines 536 shown in FIG. 5) | | | |
| devcon_cpp.txt | 11,425 | Text Document | May 2, 2004 5:19:35 PM |
| (contains the check port routine 520 shown in FIG. 5) | | | |
| IPAQSelfHelp_cpp.txt | 18,422 | Text Document | May 2, 2004 5:19:44 PM |
| (contains the selfhelp active X control 518 shown in FIG. 5) | | | |
| IPAQSelfHelp_fma.txt | 28,182 | Text Document | May 2, 2004 5:19:56 PM |
| (contains the selfhelp web page 516 shown in FIG. 5) | | | |
| ISPEInfo_cpp.txt | 2,515 | Text Document | May 2, 2004 5:20:05 PM |
| (contains the gather information program 558 shown in FIG. 5) | | | |

BACKGROUND OF THE INVENTION

The present invention relates generally to the field of computer installation and repair.

Synchronization is the task of interconnecting two personal computers and transferring information between them to cause each of them to have a full complement of up-to-date information. For example, if an individual has a pocket PC or other comparable portable computer or device (hereinafter "portable device") and also a portable or desktop office computer or workstation or other host (hereinafter "host"), a synchronization program would transfer information back and forth between them, causing the two computers to exchange names, addresses, calendar entries, notes, e-mails, word processing documents, etc., until both computers contained complete, matching sets of this information. An essential part of this task is the establishment of a data path between the two computers. Just as essential is the establishment of data paths through the layers of software, given the many differing protocols and settings.

Synchronization must be accomplished over some communication path between two computers. Virtually every computer made today has, or can be equipped, with what is commonly called an EIA Standard RS-232c serial port that can send information out of pin 2 and receive back information on pin 3 of an industry-standardized connector, with pin 6 serving as the signal ground (other wires provide flow control). More generally, "serial communication" involves sending a standardized coding of characters over a wire or cable connecting standardized ports.

In recent years, other standardized ways to transfer data between computers have emerged. "Parallel communication" can be carried out over a multi-wire cable having eight bidirectional data carrying wires (plus additional control wires to provide timing and flow and direction control) such that an entire byte of eight bits can be transferred all at once, in accordance with several upwardly-compatible protocols known as: Centronics (a bidirectional parallel printer port standard and connector developed by the company Centronics), SPP (standard parallel port, also known as the IBM PC and IBM PC AT parallel port, using an RS-232c connector), PS/2 (bidirectional parallel port design introduced on the IBM Model PS/2 computers), EPP (enhance parallel port), and ECP (extended capabilities parallel port), all of which have been subsumed as component parts of the standard IEEE-1284.

Modern operating systems, such as Microsoft's WINDOWS XP and Apple's SYSTEM X, automatically catalog and keep track of serial and parallel ports, assigning them symbolic names such as COM1 and COM2 for serial ports and LPT1 and LPT2 for parallel ports, and also requiring programs to register to use them and reporting to programs whether a given port is or is not locked for use by some particular software program. Thus, software layers are added to these two hardware protocols, increasing their complexity. A port may be unavailable to program A because the operating system has granted its use to program B.

Recently, both the serial and parallel communication protocols just described have given way to faster serial communication protocols, having their own special physical connectors or ports (as they shall be called hereafter), that can interconnect multiple computers and other devices such that data sent serially may be addressed to a particular computer or device sharing the serial communication path. Such protocols are defined by both hardware standards for ports and cables and also by software protocols including protocols for the packetizing and addressing of data.

Ethernet, the granddaddy of the so-called LAN (local area network) protocols, was developed years ago for interconnecting computers and printers and servers as well as communication routers into local area networks. Ethernet may also be used for direct computer-to-computer communication. Layers of communication software implementing higher- and lower-level communication protocols are normally required when Ethernet is used. For example, programs wishing to communicate via Ethernet may call upon one of the program-callable protocols Winsock (Windows sockets network programming) or NetBIOS (network basic input and output system). These, in turn, send out messages utilizing the TCP (transmission control protocol) and UDP (user datagram protocol) protocols which in turn break the messages up into addressed data packets using the IP (Internet protocol) protocol. The IP packets are finally broken up into Ethernet protocol packets which are delivered over the Ethernet network. Each of these protocols adds a layer of software as well as a layer of complexity to the resulting communications system.

The Universal Serial Bus or USB protocol, both in its original version and in its newer high-speed version, has recently become the most widely used protocol for interconnecting computers and other devices over short distances. USB connectors require only two wires, and the ports are very compact. Connectors may be plugged in and later unplugged while the computers are running. As with Ethernet, multiple devices may be connected to a computer's USB ports, and addressed and packetized messages may be sent from one device to another.

When either the Ethernet or the USB protocols are used in conjunction with modern operating systems, the operating systems are able to learn the identities of all local devices that are connected into the Ethernet or USB network. For example, when a new computer or device is plugged into one of a computer's USB ports, the operating system immediately identifies the connected computer or device and then prompts the user through the process of installing any required device driver software. The operating system also keeps a record of what devices are connected to each computer's USB ports through use of special software called a device manager. This feature of Windows XP is called "plug and play."

Several wireless communication protocols have recently become standardized and are now widely used. The first of these is the IrDA (infrared Data Association) infrared protocol which supports wireless communication over short "line of sight" distances (typically 3 to 6 feet). IrDA systems generally use a fairly simple serial communications protocol such that they generally operate from the perspective of application software running on a computer as if the IrDA linkage was simply a serial port interconnection between two computers or between a computer and a device (for example, a printer).

Quite similar to IrDA in its basic protocols is the Bluetooth wireless radio protocol which also is designed to work over short distances, providing intercommunication between a limited number of computers and other devices that are close together. The software protocols associated with Bluetooth, most notably the RFCOMM protocol which can emulate the various signals associated with RS-232 serial communication, are able to emulate serial port communication much as do the protocols of IrDA. Hence, a Bluetooth wireless radio connection, like an IrDS wireless infrared connection, may be used as a direct replacement for a serial communications interconnection between two computers or between a computer and a device.

The Bluetooth protocol also supports several higher-level protocols which have yet to come into widespread use. A Service Discovery Protocol (SDP) can provide a discovery process by which devices and services can be located over a Bluetooth network. A Serial Port Profile (SPP) defines operations to establish RFCOMM serial communications between two peer devices. A generic object exchange profile (GOEP) can facilitate synchronization operations, such as those discussed below; and the related synchronization profile (SP) can facilitate synchronization of files, notes, calendars, etc. between computers and also between computers and cellular telephones. A file transfer profile (FP) can facilitate the exchange of files and documents between computers.

The Bluetooth protocol is now appearing on desktop and portable host computers and also on handheld computers or pocket PCs as well as on cellular telephones and other such portable devices. Cellular telephones are acquiring pocket PC features, including the management of address books, notepads, and calendars and also e-mail and voice-mail messages. A new generation of portable devices is emerging with hard disk drives as well as all the features of cellular telephones and pocket PCs.

Another wireless radio protocol is IEEE 802.11b and its newer, faster counterpart, IEEE 802.11g. These two wireless protocols are normally used to extend TCP/IP local area networks to portable computers, to portable devices, and to computers and printers located away from Ethernet cabling. This protocol is also used for direct computer-to-computer communication for such purposes as file sharing and synchronization. Generally speaking, this protocol links computers together into a TCP/IP-UDP/IP type of network, where each computer has an assigned IP (Internet protocol) address and where communication between two applications running on two different platforms is by means of TCP messages and UDP datagrams carried by addressed IP packets.

When a program running on a portable or desktop PC equipped with the Windows XP operating system communicates with a pocket PC or other portable device equipped with the Windows CE operating system, the program may typically calls a set of functions named RAPI (remote access programming interface) or another set of functions named Winsock (Windows sockets network programming) that utilize the TCP messaging protocol and UDP datagram protocol which in their turn utilizes the IP addressed data packet protocol to communicate over whatever communication linkage has been established between the two PCs. The linkage could be an Ethernet cable, an IEEE 802.11b or g radio linkage, some combination of these two with a radio base station or Ethernet hub, a USB cable, a serial communications cable, an IrDA infrared optical linkage, or a Bluetooth radio linkage. Other types of cables and linkages will undoubtedly be developed in the future. Any such linkage may be used, and the communicating programs are normally unaware of which type of linkage has been selected by the user.

The examples presented in the discussion which follows illustratively focuses upon the use of either RS-232c ports and cables or USB ports and cables to provide communications between a PC or, more generally, a host, and a pocket PC or, more generally, a portable device for the purpose of synchronization. The use of Ethernet cabling and IEEE 802.11b or g, possibly in combination, is also discussed as another example. The IrDA infra-red and Bluetooth radio protocols are treated in this discussion essentially as alternative serial communications linkage protocols, since that is how they are normally used today. Bluetooth usage is likely to evolve into something more similar to the USB protocol, and special features of Bluetooth designed to optimize synchronization tasks are likely to be adopted as Bluetooth matures. The IEEE 802.11b and g radio protocols are essentially indistinguishable from Ethernet cable connections once they are properly set up and operating. While synchronization is the primary application discussed below, other applications involving intercommunication between two or more computers to coordinate operations, particularly in client-server applications, can also benefit from the teachings presented below.

In brief summary, there are a number of different, standardized ways in which communications may be established between, for example, a desktop or portable computer or other host and a pocket PC or other portable device by means of cable or optical or radio linkages. Once such a communication is established, then compatible applications should be able to communicate back and forth between the two computers, exchanging commands and data or files as necessary to perform tasks.

However, many problems can arise that can prevent or interfere with such communication—so many different types of problems that ordinary users of computers are frequently baffled in their efforts to solve all of the problems. For example, the task of synchronizing the calendar entries, the contact information, the task lists, and the notes contained on a portable device with those contained in a desktop or portable PC often fails because of hardware problems, software problems, and user-adjustable settings problems. Support personnel receive many more calls from computer owners seeking help in getting their portable devices to synchronize properly with other computers than they do from PC owners generally.

To figure out what is wrong and to correct problems of this type, the computer user, or the support person, needs information that may have to be gathered from many different sources—information defining the specific settings of the two application programs which are trying to communicate, information indicating whether the installation of those programs was properly done and whether the correct versions have been selected, and information defining the communication parameters and user settings buried within layers of communication software. Some information may have to be obtained from the registries of system and application settings or from the logs left by programs to show whether they were properly installed and tracking what they have tried to do and with what degree of success. Additionally, tests may have to be run on both of the computers to determine whether they can actually communicate. All of this information must be analyzed and reported in some meaningful fashion, understandable to users and to support specialists. Is the serial port or USB cable broken or not plugged in properly? Is a radio or infra-red linkage not working? Are the application programs mis-configured by the user? Are they installed properly? There may even be problems relating to the specific order in which the computers were linked together and then turned on.

SUMMARY OF THE INVENTION

One embodiment of the invention relates to an automated method using at least one computer program for troubleshooting the potential or actual inability of programs installed upon at least first and second computers interconnected by wired or wireless linkages to share or manipulate sharable information. This method comprises using at least one program installed on the first computer for testing to see if at least one hardware or software element on the first computer essential to sharing or manipulating sharable information is properly installed or configured or both, and for testing to see if information can actually be sent between the two computers. Then, if possible, that same program is used for initiating or performing testing to see if at least one hardware or software element on the second computer essential to sharing or manipulating sharable information is properly installed or configured or both. Finally the results of the testing are reported.

BRIEF DESCRIPTION OF THE DRAWINGS

FIG. 6 presents an illustrative embodiment of a diagnostic report generated by the present invention to aid the user of two computers in solving the problems that may have prevented them from being synchronized.

DETAILED DESCRIPTION OF THE EMBODIMENTS

Figure 5:
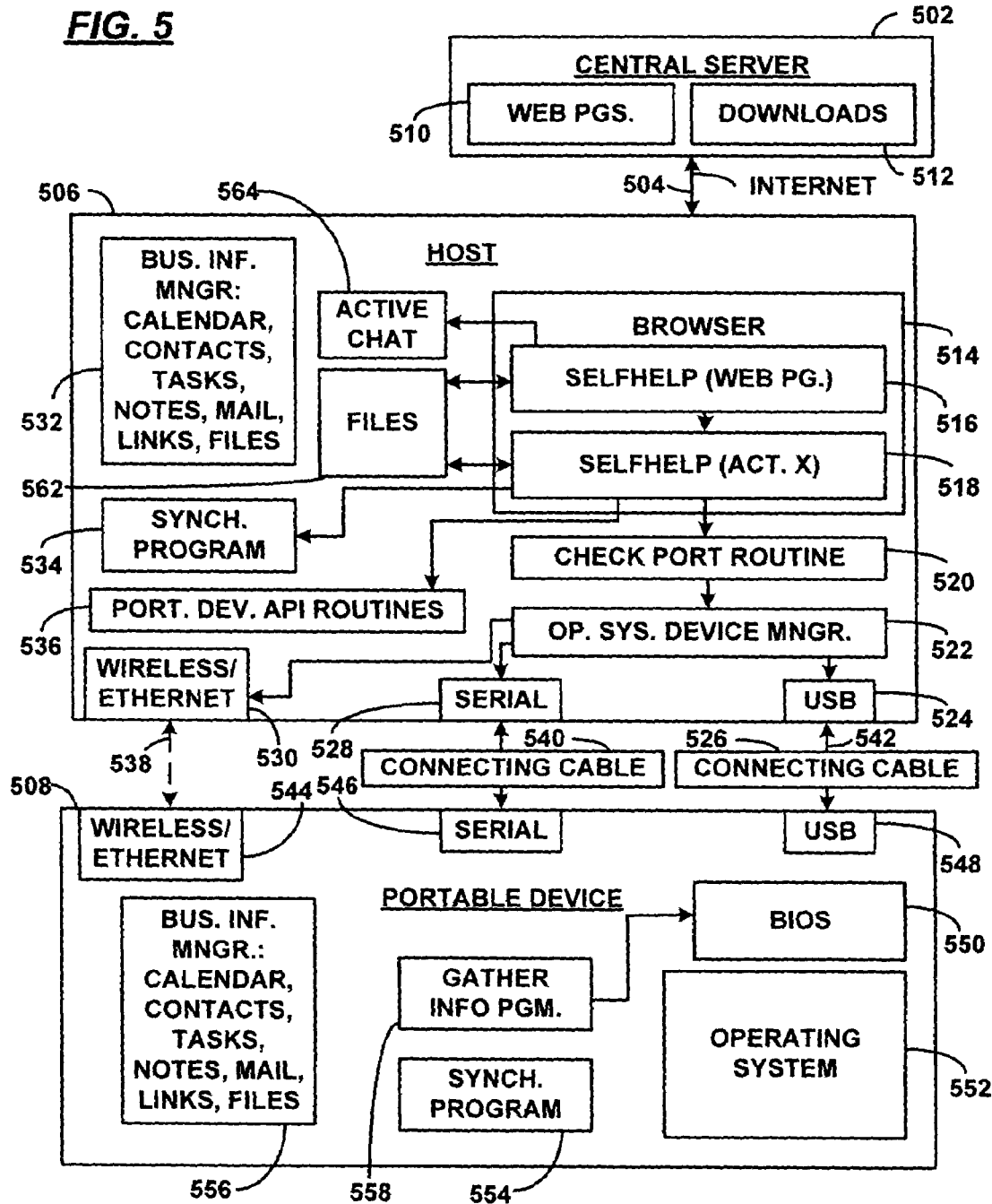
FIG. 5 is a block diagram of an embodiment of an apparatus and computer programs that are involved in carrying out the method steps just described, to synchronize information on two interconnected PCs.

The present invention will be described in the context of a specific exemplary system, illustrated in FIG. 5, and constituting an embodiment of the invention.

A. System Hardware and Software Components

An individual, referred to hereafter as the "user," has a host (or portable or laptop PC) 506 of the IBM PC variety (it could just as well be a MACINTOSH computer or a SUN workstation), equipped with a PENTIUM IV Intel central processing unit. This computer is assumed to have some type of access to the Internet 504. This computer has one (or more) USB port 524 and, optionally, one (or more) RS-232c serial port 528. A Bluetooth or IEEE 802.11b or g wireless radio port or IrDA infrared port or Ethernet port, indicated collectively as a wireless/Ethernet port 530, may also be present. If the host 506 is a portable, the port 530 may be a PCMCIA port containing an Ethernet, IEEE 802.11b or g, or Bluetooth card. Alternatively, these devices, as well as an infrared transceiver, could be built into the host 506 or plugged into a USB port or inserted into a PCI bus slot on a portable or desktop host 506.

Installed on this computer is Microsoft's WINDOWS XP operating system. This operating system includes a feature named "Plug and play" which enables it to detect many peripheral devices when they are connected to a computer. The operating system includes a device manager 522 that keeps track of what devices are connected to the computer's USB ports. The operating system also keeps track of which application program may be using its serial ports, and it locks out other applications from using a serial port that is in use. The operating system may also keep track of the usage of any Bluetooth wireless radio port or IrDA wireless infrared port, treating these ports essentially as if they were serial ports. An IEEE 802.11b or g wireless radio port or an Ethernet cable port is managed by a communication protocol stack (not shown) in accordance with the well-known TCP, DGP, and IP protocols and other similar protocols without the device manager 522 necessarily participating. Such protocol stacks may also be associated with the other types of ports as well.

The host 506 also includes a web browser 514, in this case Microsoft's INTERNET EXPLORER 6, and the installation of EXPLORER includes the installation of all the necessary drivers for Microsoft's Active-X control system of browser programming extensions. Some other browser could have been used, such as the Netscape browser; and some other browser extension or programming system, such as the JAVA programming system from Sun Microsystems, also could have been used, and then some of the programs (such as 536 and 522) used to implement the present invention would have been written in Java or in some other language compatible with the chosen browser extension system, rather than in an Active-X compatible version of C++.

Also installed on the host 506 is a suite of programs (not shown) that may generate files and documents, typically including word processing documents or files, spreadsheets, presentations, and possibly data bases. An example of such a program that can be purchased in versions designed for IBM PC compatibles or for the Macintosh is Microsoft's OFFICE Suite (currently, version 2003 for IBM PC compatibles and version X for the Macintosh). Corel also provides a suite of such programs named WORDPERFECT OFFICE (currently version 11). Sun also has a STAR OFFICE suite of such programs (currently version 7). The PC may also contain graphic or picture files, video files, music files, and other types of files as well as software for creating, revising, managing, printing, and displaying such files. The many files created by these programs typically are stored in a My Documents folder or in sub-folders within this folder, and they may need to be synchronized between two computers.

Another program installed on the host 506, and possibly also part of such an office suite, is a business information management program 532 that can manage business and other information. Such a program may be used to keep track of the user's calendar, contacts (names, addresses, telephone numbers, etc.), tasks, notes, Internet links, and e-mail or voice-mail messages. Sometimes this information may be contained in individual files and documents, but sometimes many small data items may be stored together within a single file or a small number of files, possibly organized as a single file database, and possibly partly or fully compressed or archived or both. An example of such a program is the Outlook program which comes as part of Microsoft's OFFICE 2003 Suite and which provides for the management of tasks, a calendar, contacts, notes, and e-mails. Included as part of Microsoft's OFFICE X Suite for the Macintosh is a similar program named Entourage. And a comparable set of programs in Corel's WordPerfect Office 11 Suite is the Corel Central suite of programs for managing a day planner, a calendar, a card file, memos, alarms, an address book, and e-mails.

The user also has a pocket PC or other portable device 508. In the discussion below, it is assumed that the user possesses a Compaq IPAQ H3800 series Pocket PC. Of course, there are many other types of small personal computers that could have been chosen in this exemplary system. The pocket PC is equipped with the WINDOWS CE operating system 522 as well as with companion Microsoft software that implements a business information manager 556 which, for example, manages a calendar, contacts, tasks, notes, Internet links, and possibly an e-mail or voice-mail system or both. The Pocket PC also may contain other files that may be in need of synchronization, such as word processing, spreadsheet, and graphic or image files as well as music files, video files, and possibly general-purpose database files as well.

The portable device 508 may be equipped with a single port that serves as both a serial port 546 and as a USB port 548. Other pocket PC models may have separate ports 546 and 548 supporting these two protocols, or they may have only one of these two ports. The portable device 508 typically comes with a matching set of connecting cables 526 and 540 one of which 540 is wired as a serial communications cable and the other of which 526 is wired as a USB cable. Both of these cables have industry standard PC connectors at one end, and both share a single special pocket PC connector at the other end. Alternatively, the two cables 526 and 540 may be entirely separate. Either of the two cables 526 and 540 may be used to connect the portable device 508 to the user's desktop or portable computer or, more generally, host 506.

Optionally, the portable device 508 may be equipped with a PCMCIA accessory port into which an IEEE 802.11b or g radio, Bluetooth radio, or Ethernet PC Card may be inserted, this accessory port and the chosen card together forming the wireless/Ethernet port 544. Or the radio logic and antenna or an Ethernet port can be built directly into the portable device 508. Alternatively, the port 544 may be an IrDA infrared transceiver that is built into the portable device 508 or otherwise attached to it. A pocket PC may have both a radio port and also an IrDA port as well as a separate Ethernet port.

A direct radio linkage 538 between the two PCs 506 and 508 can be established using the IEEE 802.11b or g protocols without the need for any wireless base station, as is commonly done with the Apple AIRPORT radio communication system. But more commonly with the IEEE 802.11b and g protocols, a wireless radio base station (not shown) is provided as an intermediary that can communicate with both PCs 506 and 508 by radio. The base station may also communicate with either or both PCs 506 or 508 by Ethernet cabling, or it may communicate with one PC by radio and with the other by Ethernet cabling. Hence, the communication linkage 538 can include a wireless base station (not shown) and possibly some Ethernet cabling as well. If the entire linkage 538 is established by means of Ethernet cabling, then a base station or Ethernet hub may be present, but such a hub or base station may be omitted and a direct cable connection may be established through the use of a special Ethernet cable that has its electrical connections reversed so as not to require any intervening hub or base station. A common user error is attempting to connect two computers together by means of a standard Ethernet cable, rather than such a special cable.

If the PC's port 530 and the pocket PC's port 544 are both built-in IrDA infrared ports, the user must position the two computers near each other, reasonably close together, with the ports 530 and 508 aligned so as to "see" each other. The user thereby establishes an infrared light linkage 538 between the two computers. If a radio linkage is used as all or part of the linkage 538, the user must arrange for the transceivers to be reasonably close together and not separated by any metallic barrier that can block radio signals.

To achieve synchronization between the files, tasks, calendars, contacts, notes, e-mails, etc. of the portable device 508 and the host 506, it is necessary for the user to install synchronization programs 534 and 554 on both computers. In the case of Microsoft programs, the synchronization programs are named ACTIVESYNC. Versions 3.5 and more recent versions of these programs support synchronization using a wired serial cable interconnection, a wired USB cable communication, a wireless IrDA infrared protocol interconnection, or a networked (Ethernet or wireless radio IEEE 802.11b or g) interconnection between the host 506 and the portable device 508. The most recent version 3.7 of ACTIVESYNC also provides support for a Bluetooth radio interconnection.

The user's host 506 is presumed to have some access to the Internet 504, possibly by Ethernet cable or IEEE 802.11b or g wireless radio linkage to a corporate LAN and WAN, to a telephone line by means of a DSL or conventional (dial-up) modem, or to a cable TV line by means of a cable modem. Using the browser 514, the user may gain Internet access to some form of support service. For example, a web-based user support service can provide self help to the purchasers of a particular model of pocket PC. This service could comprise web pages 510 and various downloadable materials 512, including programs and documentation as well as help materials, all set up on a central server 502. Another service that may be provided is a "chat" type of support service that enables a user to "chat" in real time with a service representative. To enhance such a "chat" service, a program such as the active chat 564 program shown installed on the host 506 may be downloaded by the user and installed on the user's host 506 to gather status information concerning the state of the user's computers. This information can be forwarded directly to the service representative prior to the commencement of such a "chat" session. For example, Motive Communication's SERVICENET Platform, which includes programs such as MOTIVE CHORUS, MOTIVE INSIGHT, MOTIVE DUET, and MANAGEMENT CONSOLE, can be used in this general manner. For use with the present invention, such a program would preferably be extended to supply the service representative with reports such as that illustrated at 600 in FIG. 6, a diagnostic report on the problem which confronts the user.

The present invention comes into play only after the user has set up the host 506 and the portable device 508 with some or all of the software just described, and after the user has used both computers in the normal course, possibly creating files containing word processing and other documents; downloading graphic, music, and audio-visual files; creating e-mail and voice-mail messages; and creating or receiving contacts, task, notes, web links, and calendar information.

At some point, the user decides it is time to "synchronize" the two PCs 506 and 508 so that both PCs will have, for example, identical sets of files in their "My Documents" folders and subfolders; identical sets of e-mail and voice-mail messages; and identical calendar, contact, task, note, and web link information. To accomplish this, the user interconnects the two computers by means of: a USB cable 542; a serial port cable 540; or a wireless/Ethernet linkage 538. The wireless linkage might be an IrDA infrared linkage, an IEEE 802.11b or g TCP/IP radio linkage (possibly including one or more Ethernet segments, hubs, routers, and/or wireless base stations, as was explained above), or possibly a Bluetooth radio linkage.

The user then powers up both of the computers 506 and 508, starts up each computer's synchronization program 534 and 554, and commands the two synchronization programs 534 and 554 to begin the synchronization process, passing data and/or files back and forth over the linkage or cable to synchronize some or all of the files and data within file-based data bases on the two computers 506 and 508. Given the complexity of the systems on the two relatively incompatible computers, there is a high likelihood that synchronization will fail. Layer upon layer of software and hardware elements provided by multiple design teams must have been set up properly to work in precise synchronism and harmony if this task is to be carried out successfully.

It is the failure of this synchronization operation that causes the user to place the present invention into operation. The user uses the browser 524 to access service self-help web pages 510 maintained on the central server 502. The user clicks on a web linkage labeled "Pocket PC Synchronization Diagnostic" (or an equivalent title) that initiates the downloading of an html selfhelp web page 516 (the HTML source code for this web page program is contained in a file named "iPAQSelfHelp.fma" which can be found in the CD-R Program Listing Appendix, where the file has been renamed "iPAQSelfHelp_fma.txt"). This web page program is designed to guide the user through the complex process of figuring out why the synchronization operation has failed; and then, if possible, guide the user through the process of correcting whatever problems are found. And if the problems are beyond the scope of user self-help correction, then this web page 516 invites the user to click on another linkage that initiates a "chat" session with a service representative, using the active chat program 564 as was explained above.

Selection of the "Pocket PC Synchronization Diagnostic" web page causes the selfhelp web page 516 to be downloaded onto the user's computer 506 and into the browser 514. The web page begins by displaying a message on the screen explaining that diagnostics are about to be preformed, and it asks the user to click on a "start" button (or its equivalent) and then to wait while this is done.

As various systems and devices are tested, messages such as those shown at 600 (FIG. 6) appear upon the screen, one after another, as each procedure is completed. For example, the message "Checking Synchronization Program Installation" might appear first. This check is performed. If this check verifies that the synchronization program has been properly installed, a check mark appears, followed by a message such as: "Synchronization program installation and version checked." But if there is a problem, then a colored diamond appears (shown in black-and-white in FIG. 6), and a brief explanation of the problem is presented. In some cases, this brief explanation may be accompanied by a linkage to a source of useful information, such as a check list suggesting possible problems and their solutions or a procedure explaining in detail how to perform some task or a link to a download site where a needed program may be found, downloaded, and installed.

When all of the tests have been completed, the message "The Preliminary Diagnostics is Complete" appears, as is shown in FIG. 6. Under this are printed support options that the user then has. For example, the user may be invited to view "solutions to common problems" relating to the portable device 508, or the user may be given the option of downloading, installing, and running hardware diagnostics programs on the pocket PC. "Active chat" is another option that enables the user to communicate in "chat" mode with an on-line support specialist who is supplied with a general status report on the PC plus a copy of the report 600 shown in FIG. 6, possibly with more technical details (IP addresses, Wins address settings, and the like) that are not understandable to a typical user.

The selfhelp web page 516 is an html web page that includes embedded control scripts that invoke callable procedures within active-X controls. The web page 516 includes all of the graphic user interfaces (GUIs) and control scripts required to run the diagnostics that help to resolve the PC to pocket PC communication issues. Once activated, this web page begins by downloading (from the central server 502) and installing on the host 506 a signed active-X set of control programs which are delivered in the form of a single, compressed, multi-file "*.CAB" file. The *.CAB format permits multiple files, including DLL files and EXE files (for example), to be delivered in a single download operation. Once downloaded, the *.CAB file is opened, the files that it contains are separated and expanded, and the files are installed as operative software elements of the host 506 and of the portable device 508. These active-X software elements give the control scripts within the web program 516 complete access to the data and callable procedures of the user's host 506 and portable device 508. Four of these software elements are described next.

A first downloaded file is an active-X control program which may be called the selfhelp active-X program 518. This control or program 518 serves as the main component of the active-X control. It is written in C++ and is compiled into a Windows 32-bit dynamically-linked library (Win 32 *.DLL file). (The source code for this program is contained in a file named "iPAQSelfHelp.cpp" which appears in the CD-R Program Listing Appendix slightly renamed as the file "iPAQSelfHelp_cpp.txt"). The selfhelp program 518 exposes the methods and controls that the control scripts within the web program 516 are able to invoke to run all of the diagnostics needed. In response to the web program 518 invoking a method in this active-X control, this program 518 in turn may call upon other dynamic link libraries of programs (DLLs) or other executable programs (EXEs) and then return the results back to the invoking control script within the web program 516. Communication back to the web program may be carried out through the creation and use of XML structured data files 562 which the selfhelp program 518 and programs that it calls create and save and which the control scripts within the selfhelp web program 516 may then read and parse for data values. In this manner, tests are performed, data is gathered, and the data is fed back to the selfhelp web program 516 and is used to guide the assembly of the report that is displayed to the user, such as the illustrative report 600 (FIG. 6).

A second downloaded file is a Win 32 executable program (*.EXE file) which may be called the check port routine 520. (The source code for this program is contained in a file named "devcon.cpp" which can be found in the CD-R Program Listing Appendix as a file with the slightly altered name "devcon_cpp.txt". This file is compiled into an executable program with the altered name "devenum.exe"—a name derived from the phrase "device enumerator.") The routine 520 is invoked when a control script within the selfhelp web program 516 gives a call to a particular method in the selfhelp active-X program 518, and that method initiates execution of the routine 520. Once placed into operation, the routine 520 calls upon the operating system's device manager 522 to provide a list of the status of all the plug and play devices that are currently registered by the operating system. This list is saved in the form of an XML formatted file that is included among the files 562 and thereby passed back to the selfhelp web page 516. A control script within the web page 516 may then open and read this file, parsing the file to check for the status of the pocket PC as a registered device attached to the USB port 524. This information will indicate whether the portable device 508 is connected to the host 506's USB port 524, and whether the cable 526 and ports 524 and 548 are functioning properly.

The routine 520 is only invoked if the operating system controlling the host 506 is one that supports the plug and play automatic device identification and registration protocol, such as WINDOWS XP. If the operating system is one that does not support plug and play, such as Windows NT version 4.0, then the routine 520 is not utilized, and some of the tests described below may not then be performed.

A third downloadable file is also an active-X control program which may be called the pocket PC API (application programmer interface) routines 536. This control or program, named "asyncdiag.cpp" (reproduced in the CD-R Program Listing Appendix, where this file is slightly renamed "asyncdiag_cpp.txt") is also written in C++. It is compiled into a Win 32 DLL (Windows 32-bit dynamically-linked library). These API routines 536 are invoked by control scripts within the selfhelp web program 516 through various methods in the selfhelp active X control program 518. Illustrative source code for all of these routines 536 is set forth in the CD-R Program Listing Appendix. At the end of this specification, a summary description of each of these routines is presented together with the first line of each routine, to serve as an aid to finding the individual routines within the source code file "asyncdiag_cpp.txt" on the CD-R Appendix.

A fourth downloadable file is transferred from the host 506 to the portable device 508 and is then installed as the gather info program 558 (FIG. 4) on the portable device 508. (This program's source code file is named "ISPEInfo.cpp," and the CD-R Program Listing Appendix contains a copy of this file with the slightly altered name "ISPEInfo_cpp.txt".) This program 558 gathers model information, etc., from the pocket PC and returns it to the calling program on the host 506. The source code for this program 558 is set forth in the CD-R Program Listing Appendix in the file named "ISPEInfo_cpp.txt". The transfer of this program 558 into the pocket PC is carried out by a "copyFileToDevice" method or function, the source code for which can be found in the CD-R Program Listing Appendix within the source code file "asyncdiag_cpp.txt", since this method or function is part of the pocket PC API routines 536. The call upon this program 558 to gather data is placed by a "getIPAQModelInfo" routine, also described in the CD-R Program Listing Appendix in the file "asyncdiag_cpp.txt", and also one of the pocket PC API routines 536. The final erasure of this program 558 from the memory of the portable device 508 is carried out by another method or function "deleteFileOnDevice" the source code for which is also presented in the CD-R Program Listing Appendix and in the file "asyncdiag_cpp.txt" and that is also one of the pocket PC API routines 536.

B. Method Steps Carried Out by the Programs

Figure 1:
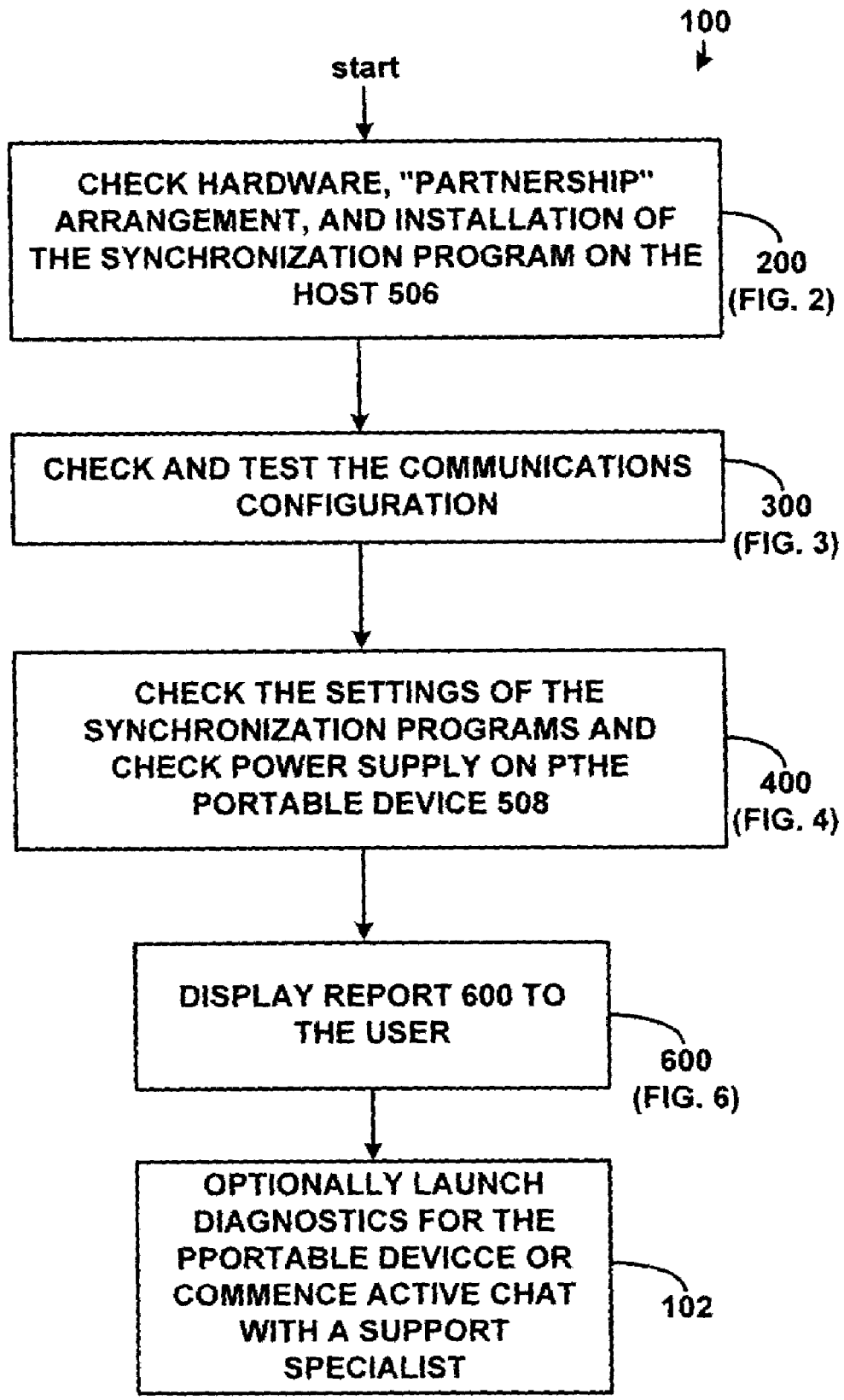
FIG. 1 is an overview block diagram of an embodiment of an automated method of assisting a user in determining why a host is unable to synchronize with a portable device.

The method steps 100 that are performed by this embodiment of the invention are presented in the remaining figures, FIG. 1 through FIG. 4. FIG. 1 presents the method 100 in brief overview, and the details of the method 100 steps are presented in FIGS. 2 to 4. The low-level methods or functions that are used to carry out many of the more detailed steps of this method are set forth in the CD-R Program Listing Appendix, as has already been explained.

The method steps described here are carried out by the selfhelp web page 516. This web page 516 invokes methods defined within the selfhelp active X control or program 518, and these methods in turn make calls to methods or functions included in the set of pocket PC API routines 536 (the source code for which appears in the file "asyncdiag_cpp.txt" on the CD-R Program Listing Appendix). Some of the API routines install the gather info program 558 (the source code for which is also described in the CD-R Program Listing Appendix in the file named "ISPEInfo_cpp.txt") on the portable device 508 and then call upon the program 558 to gather information from within the portable device 508. The selfhelp active X control also places into execution the check port routine 520 which calls upon the operating system's device manager 522 to determine device status and registration, and this data is returned to the selfhelp web page 516 contained within an XML temporary file that is saved temporarily among the files 562. After all the tests have been run and all the data gathered, the selfhelp web page 516 generates the report 600 (FIG. 6) and presents it to the user along with linkages to additional materials, to hardware test procedures, and to live, online communication with a support specialist, as is shown in the illustrative report 600 (FIG. 6). After all tasks are completed, the programs and files created and saved may all be deleted, leaving no remnants on either the portable device 508 or on the host 506.

The method 100 proceeds as follows:

After the user clicks the "start" button, the information gathering and diagnostic tasks begin. These tasks are summarized in FIG. 1 at 100. First, the portable or desktop host 506's communications permission settings are checked to make sure that the portable device 508 will be treated as a "partner," entitled to run programs and to create and alter files as well as to view both files and data; then the hardware is checked out to make sure it is working; and then the installation of the synchronization program 534 on the host 506 is checked out, to make sure it is properly installed (step 200 in FIG. 2). Next, the user's chosen communication configuration is checked and then tested (step 300 in FIG. 3). Once communications have been verified, the synchronization program 554 on the portable device 508 is checked out; and then the portable device 508's power supply (battery state of charge, whether powered by AC cord) is also checked out (step 400 in FIG. 4). Finally, a complete diagnostic report 600 (FIG. 6) is generated for the user. If problems remain, and in addition to offering the user access to various online user assistance materials (checklists, step-by-step procedures, etc.), at the user's option an online "chat" session can be established with a support specialist who is supplied with information defining the configuration of the two computers as well as the report 600 or a more technically-oriented version of this same report; or the user may launch a set of diagnostics specifically designed for the portable device 508 (step 102 in FIG. 1, presented as clickable options at the very end of the report 600 presented in FIG. 6).

Figure 2:
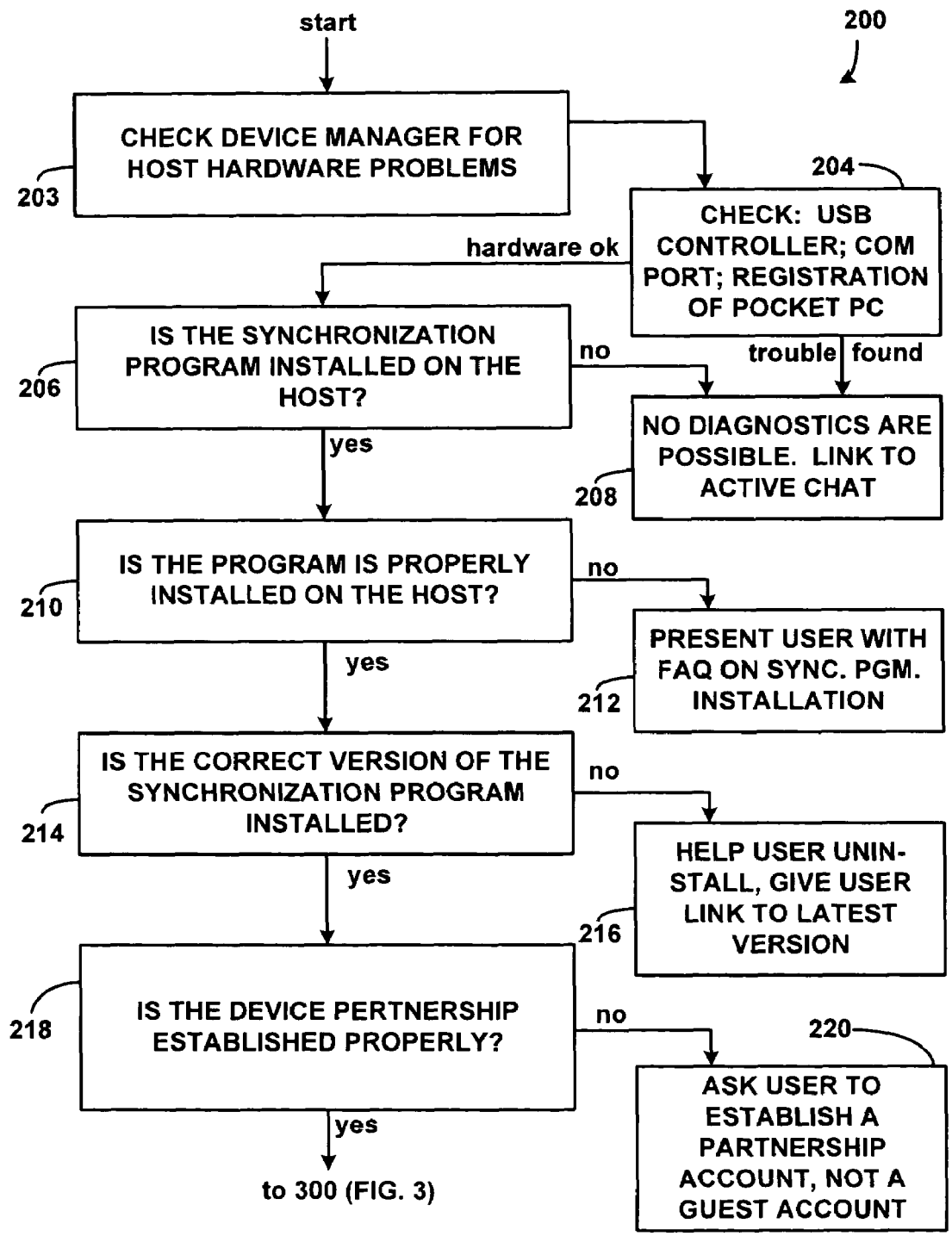
FIG. 2 is a block diagram of an embodiment of an automated method of checking a host PC for hardware and software installation related problems.

Referring now to FIG. 2, this figure presents the initial steps carried out in the process of determining why synchronization cannot be achieved.

First, a check is made for possible hardware or device problems in the host 506 (step 203). The device manager 522 is called upon to report whether the USB serial controller and the "communications" (or parallel) port are working properly, and a check may also be made to see if the host 506's network connection to the external TCP/IP network is up and running (step 204). Other hardware and device checks may also be performed, but in this embodiment the testing is limited to devices that are possibly relevant to the failure of the synchronization process.

If all appears to be well, then testing continues. On the tentative assumption that communications may be by means of the USB bus port 524, a check with the device manager 522 is made by the check port routine 520 to see if the portable device 508 is formally registered as connected to the USB bus, signaling that the user is actually using the USB connection to connect the two computers (also step 204). The result of this check is saved for possible later use.

If the hardware is not reported to be OK, then no further diagnostics are performed. The user is invited to link into an active chat session with a support specialist, or the user may be referred to a hardware diagnostic procedure or asked to have the computer serviced (step 208).

If the hardware is OK, then at step 206 a test is made to see if the synchronization program 506 has been downloaded and installed on the host 506. If the program 506 has not been installed, then no further diagnostics are possible. Once again, the user may be invited to link into an active chat session with a support specialist (step 208), or the user may be directed to a file download web site from which a copy of the synchronization programs 534 and 554 for the host 506 and the portable device 508 may be downloaded and installed. The user may be stepped through the process of ascertaining that either the USB port 528 or the serial port 524 is up and running and communicating with the portable device 508, since one of these ports 524 or 528 will be needed when the portable device 508's synchronization program 554 is installed on the portable device 508 for the first time.

Next, at step 210, a further check is made to see if the synchronization program 534 is properly installed on the host 506. If not, at step 212 the user is presented with a set of "frequently asked questions" relating to the process of installing the synchronization program, and the user is invited to try and cure the installation problem. The installation might be incomplete, for example. The user may be prompted through the process of uninstalling and then reinstalling the active synchronization program 534 (FIF. 5) and doing so using an administrator account on the host 506. The user may also, at this point, move into an active chat session with a support specialist.

Then, at step 214, the version of the installed synchronization program 534 is obtained from the registry and is checked (step 214). An upgrade may be required. For example, versions prior to version 3.5 do not support WINDOWS XP nor Office XP Outlook nor an IrDA infrared linkage to the portable device 508. If the version is incorrect, step 216 invites the user to transfer to a download site from which the latest version of the synchronization program may be obtained.

These checks are carried out by a call made to the method or function "checkActiveSyncInstallation," which both checks for the installation of the program 534 and also determines (if possible) which version is installed. A listing of this program appears in the CD-R Program Listing Appendix, and a summary description of it, appears in the final portion of this specification.

The final check shown in FIG. 2 is one to see what type of access the user of the host 506 has set up for the portable device 508 (step 218). If the settings on the host 506 permit the portable device 508 access to the host 506 only as a "guest user," the portable device 508, acting as a client, will not have enough authority to command the host 506 to carry out the necessary synchronization tasks. And, of course, if the settings prohibit the portable device 508 from accessing the host 506, synchronization will be impossible. In either case, the settings then must be adjusted to give the portable device 508 access to the host 506 as a full "partner," and not simply as a guest user (step 220). This is a frequently-encountered error which users have great difficulty in finding. This check is performed by a method or function "checkDevicePartnership." The final portion of this specification presents a brief description of this program, and its source code appears within the file "asyncdiag_cpp.txt" in the CD-R Program Listing Appendix.

Figure 3:
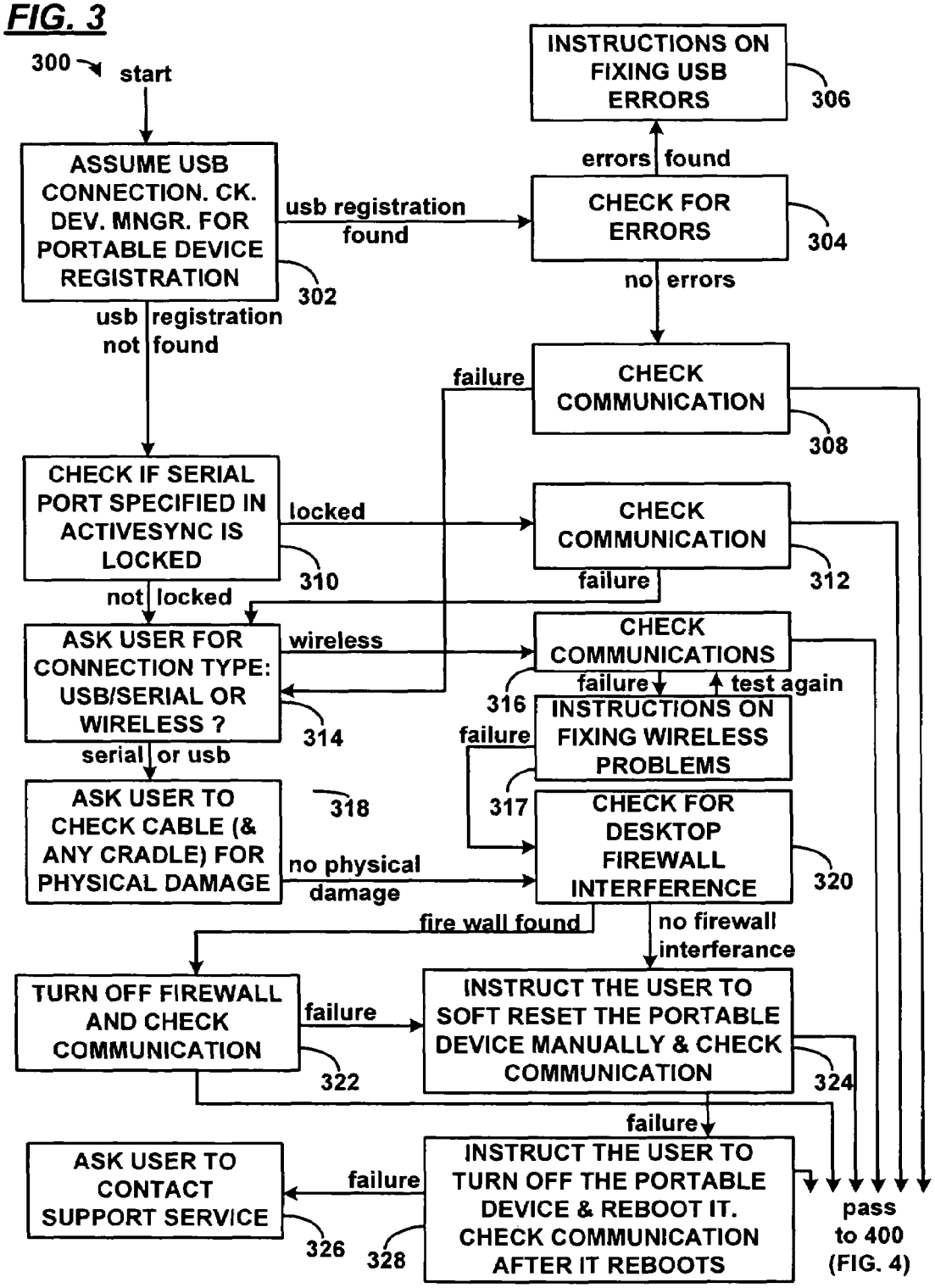
FIG. 3 is a block diagram of an embodiment of an automated method of checking out the communications configuration of a host PC as well as its ability to communicate with a portable device.

Next, the method proceeds to the step 300 which is set forth in FIG. 3. Step 300 checks out communications between the host 506 and the portable device 508 first by checking out various communication parameters and secondly by actually performing a live test. The live test checks out any cables, connectors, radio and infrared transmitters and receivers, and it also checks out the operative state of the portable device 508.

At the outset of step 300, a call is made to the method or function "checkConnectionSetting" (a description of which appears in the final portion of this specification and illustrative source code for which is set forth in the CD-R Program Listing Appendix in the file "asyncdiag_cp.txt"), to determine which connection paths the user has explicitly configured the synchronization program 534 to permit. In the case of Microsoft's ActiveSync program, the user can, by clicking the mouse button in a "Connection Settings" window of this program, allow one or two or all three of the following communication paths to be established: serial cable or infrared communications, and specifying the port "COM1" or "COM2" or "Infrared Port (IR)"; USB communications; and "network (Ethernet) and Remote Access Service (RAS) server connection." The information gathered by this function is used in several of the steps that follow. It is possible that these settings may prohibit all communication, and this will need to be adjusted. Or these settings may prohibit the specific communication technique that the user is now attempting to use.

Beginning at step 302, the tentative assumption is made that communication will be between the host 506's USP port 524 and the portable device 508's USB port 548 over some form of USB connecting cable 542. If there are no hardware problems with the cable or ports or connectors, and if the portable device 508 has performed the usual initial USB identification handshake with the device manager 522 to establish the portable device 508's identity within the host 506, then the check port routine 520 will discover that the portable device 508 is registered with the plug and play operating system of the host 506. This step is carried out by the check port routine 520 gathering this registration information from the device manager 522. (This step may have been carried out previously as part of the step 204 in FIG. 2.)

If a USB registration is found for the portable device 508, then this confirms not only that the user plans to use USB communications over the cable 542 but also that the pocket PC is running and that the cable and its connectors are working. Accordingly, control proceeds to the step 304 where a check is made for any operating system record pf errors in the USB communications devices. If errors are found, then at step 306 the user is presented with instructions on how to fix the errors found and is also given the option of starting an active chat session with a support specialist.

If no errors are found, then communication with the pocket PC is actually tested out by calls made to what are called the Win CE RAPI (remote access programming interface) functions (step 308). More specifically, these calls are made by a method or function that tests out communication between the host 506 and the pocket PC. This function is named "checkCommunication" and is described in the final portion of this specification—an illustrative program listing appears in the file "asyncdiag_cpp.txt" in the CD-R Program Listing Appendix. If this communication test is passed, then the next steps performed are the steps 400 presented in FIG. 4. If this actual communication test fails, then the next step performed is the first of several communication troubleshooting steps beginning with step 314 and described below.

Returning to the step 302, if a USB registration for the portable device 508 is not found, the next step 310 checks to see if the user has enabled serial communication and designated a serial path—either COM1, COM1, (etc.), or infrared. A "ckeckserialport" method or function (described in the final portion of this specification—source code can be found in the file "asyncdiag_cpp.txt" in the CD-R Program Listing Appendix) makes a call to the operating system and asks for permission to use that same designated port. If the call fails, this signifies that the designated serial port has been reserved by the synchronization program 534 for its own use and that the portable device 508 is probably connected to the serial port 528 by means of a cable 540 or, if the infrared port is designated, by means of the wireless ports 530 and 508 and an infrared linkage. In other embodiments of the synchronization program 536, a Bluetooth wireless radio port may be listed as a designatable serial port, possibly handled in much the same way as a designated IrDA infrared wireless serial port.

If the designated port is locked, then the actual test of the communication channel (described above in step 308) is performed in step 312. If the communication test is successful, then the designated port works, and the next step performed is step 400 presented in FIG. 4. But if the communication tests fails, then the next step performed is step 314, the first of several diagnostic steps.

AT step 310, if the designated serial port is not locked, then either a wireless radio IEEE 802.11b or g protocol is in use or else a USB or serial port (or infrared or Bluetooth) communication channel is not operative for some reason. If a wireless radio or infrared linkage is a possibility.

The next step is step 314. At step 314, the user is asked which connection type the user has selected: a wireless linkage or a cable linkage (either serial or USB). If the user answers the linkage is a wireless linkage, then if it is an IEEE 802.11b or g radio linkage (possibly partially implemented using Ethernet cabling and possibly also including a base station or hub, as was explained above), at step 316 the same actual check of communication described with reference to steps 308 and 312 can be carried out. If this communications test is passed, then the next step is step 400 in FIG. 4. But if this test fails, or if the protocol the user has selected is Bluetooth or IrDA infrared, then at step 317 the user is provided with detailed instructions on how to set up wireless communication. The need for the transmitter and receiver to be near each other in the case of Bluetooth and IrDA is explained, as well as the fact that infrared light travels only in straight lines and cannot penetrate walls while radio signals cannot penetrate metal barriers. Explanations of possible Ethernet cabling problems, as well as wireless base station and Ethernet hub problems, and also PCMCIA slot and PC Card problems, and also possibly problems associated with the settings of the software that may be provided with these accessories, may also need to be presented here. For example, in some instances, the IP address of the host 506 may need to be ascertained, and it may need to be fixed (if it is normally variable and obtained from a DHCP server) and installed by the user as the "Wins" server address within configuration software within the portable device 508. (For example, see the article entitled "Have I Got Connections!" by Barb Bowman, posted on Sep. 24, 2001 on Microsoft's web site.) The test communications step 316 may be repeated several times, with instructional materials presented between each such test, until either the test is passed or until repeated failures cause the step 320 to be the next one.

If, at step 314, the user had indicated that a serial or USB cable communications protocol had been selected, then at 318 the user is asked to check the cable, the cable connectors, the ports, and any cradle for possible physical damage. Instructions explain how this can be done. If there is no physical damage, then the next step is step 320, a step shared by all cable and wireless protocols that have failed the live communication check.

At this point, it is known that the communication channel does not work, and so a number of possible reasons for this need to be checked out. At step 320, the possibility of firewall interference with communication is checked out. The two synchronization programs 534 (on the host 506) and 554 (on the PC 508) communicate with each other using the Internet TCP/IP (or possibly UDP/IP) protocol ports 990, 999, 5678, and 5679. Other similar synchronization programs might make use of the NetBIOS ports 137 and 138 or other TCP or UDP communication ports (sometimes called "sockets"). If the user has enabled a firewall on the host 506 to prevent the entry of hackers and the like from the actual Internet, that firewall could be blocking these needed communication ports, preventing any TCP or UDP communications even though the communication channel is otherwise clear and fully operative for the passage of IP addressed packets (performing such tasks as fetching web pages or e-mails).

Accordingly, at step 320, the user is asked to check for any possible firewall interference. On an XP machine, the user is asked to open up a window "Local Area Connection Properties," click on the "Advanced" tab, and then remove any checkmark from the square box that enables the WINDOWS XP built-in "Internet Connection Firewall." The firewall might also be found within add-on protective software obtained, for example, from McAfee or from Symantec. Preferably, instructions would be included for disabling, or for creating passages through, the most commonly-available firewall software products. If a firewall is found, the user is instructed to turn it off at step 322, and then the live communication check is performed again. If this check is passed, then the next step is step 400 in FIG. 4.

If, at step 320, there is no firewall, or if, at step 322, the firewall has been turned off but the communication check still fails, then at steps 324 and 326 the user is asked to perform some tasks that sometimes serve as workarounds of remaining bugs either in the synchronization programs 534 and 554 or in the two PC's operating systems or communication software. At step 324, the user is instructed to soft reset the portable device 508, and the live communication check is then performed again. If this fails, then at step 328 the user is instructed to turn off the portable device 508, re-boot the host 506, and only then turn the portable device 508 back on again. (Disconnecting and re-connecting the portable device 508 may also solve this particular problem—see Microsoft Knowledge Base Article 321935.) Then the live communication check is performed again. If the communications check is now passed, the next step is step 400 in FIG. 4.

If success is not achieved, then at step 326, the user is invited to initiate an active chat session with a support specialist. But first, the function "getModelInformationFromDesktopReg" (source code can be found in the file "asyncdiag_cpp.txt" in the CD-R Program Listing Appendix, and a brief description is presented in the final portion of this application) is run in an attempt to gather from the host 506's registry the4 portable device 508's model number and other such helpful information, if that information can be found recorded there from past successful communication sessions between the two PCs 506 and 508. This information is passed on to the support specialist along with other useful configuration information and the report 600.

Figure 4:
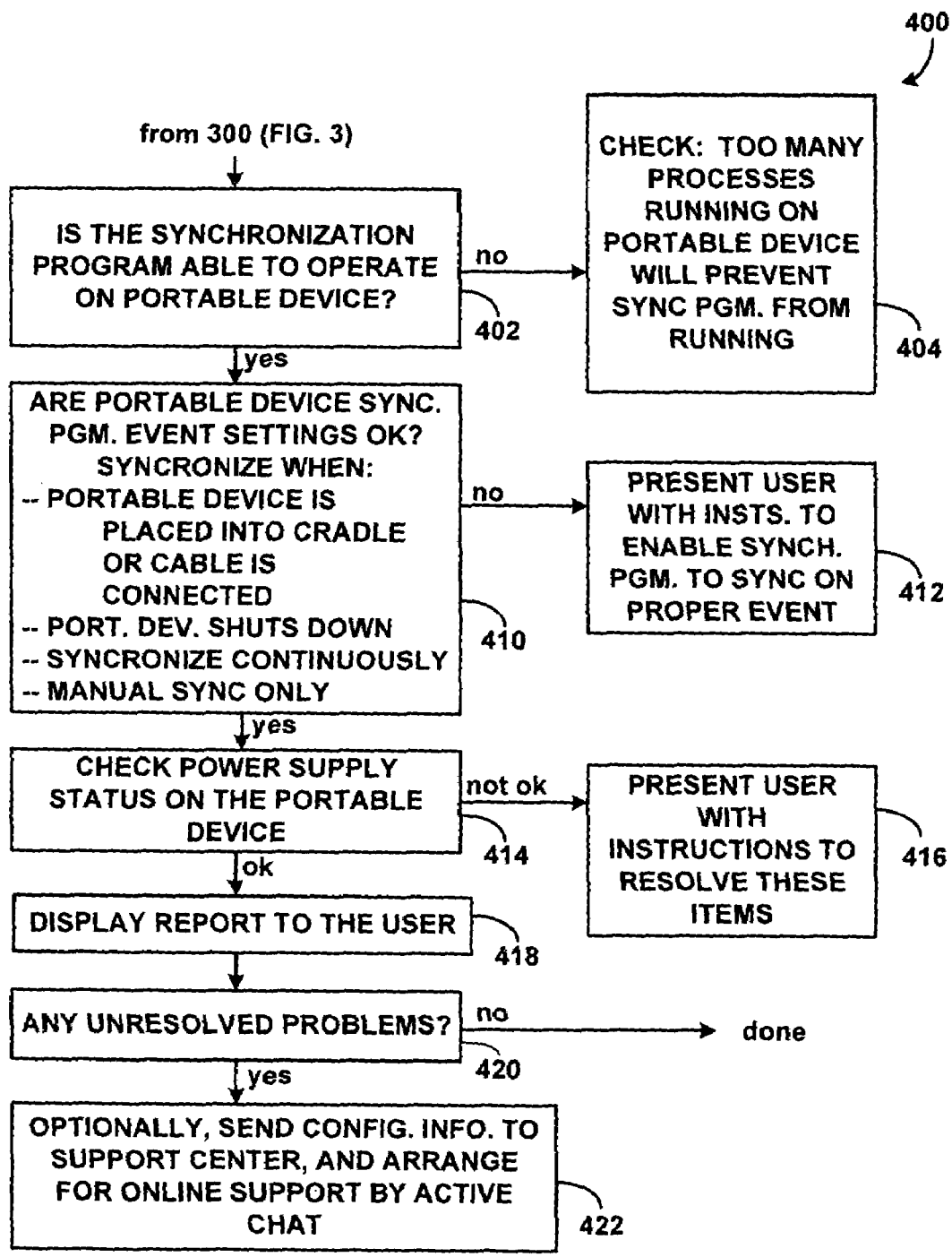
FIG. 4 is a block diagram of an embodiment of an automated method of checking for the necessary permissions and application program settings necessary to perform synchronization as well as to check the power supply and possibly other elements of the portable device, including the step of seeking online support after transmitting configuration information to a support center.

The step 400 shown in FIG. 4 begins only after the live communications check presented in FIG. 2 has been passed, such that the host 506 is known to be communicating properly with the portable device 508.

In some other embodiments, the step 402 might need to check to see that the synchronization program 554 is properly installed on the portable device 508. In an embodiment employing an IPAQ Pocket PC with Windows CE in ROM, the synchronization program is part of the operating system and is located in ROM at all times, so such a check is probably not be necessary. A check is made to see if the synchronization program 554 is operative, that is, actually working properly. If not, then as noted at step 404, a check is made to see if, perhaps, more than or close to 32 programs are running simultaneously on the Pocket PC, which is the maximum permissible number of simultaneously running threads on the current version of Windows CE. If too many program threads are running on the portable device 508, the user is advised of the problem and is instructed to shut some of them down. To gather this and other portable device 508 information relevant to servicing, such as the model number, OEM number, serial number, and ROM upgrade version, a gather information program 558, named ISPEInfo.cpp (source code appears in the CD-R Program Listing Appendix in the file named "ISPEInfo_cpp.txt") is downloaded into and installed on the portable device 508 and can then be called upon by the method or function getIPAQModelInfo (source code for this function appears in the file "asyncdiag_cpp.txt in the CD-R Program Listing Appendix) to gather information of this kind from the portable device 508.

Next, at step 410, the synchronization program 554's settings are checked to see if synchronization is permitted on the portable device 508. In the present embodiment, the synchronization program 554 is queried to see what events trigger synchronization. It can be set to provide manual synchronization only, thus not synchronizing the two PCs automatically but only when the user actively commands the program 554 to perform synchronization. It can also be set to provide fully automatic synchronization whenever the two PCs are coupled together and a change is made in one or the other. It can be set to synchronize only with the portable device 508 is shut down, or only when the pocket PC is first placed into its cradle or is otherwise first connected by cable to the host 506. Whatever the setting, the user must be advised of this setting and offered an explanation (step 412) of how to alter this setting if the user is dissatisfied with it. For a coding example, see the functions "checkApplicationSyncSettings" and "CheckSyncEventSettings" (the source code for which appears in the file "asyncdiag_cpp.txt" presented in the CD-R Program Listing Appendix).

At step 414, the status of the portable device 508's power supply is checked by means of a method or function "checkPowerSupply" (source code for which appears in the file named "asyncdiag_cpp.txt" which appears in the CD-R Program Listing Appendix). If the portable device 508 is tested and found to be connected to an external source of supply, this test determines whether the battery of the portable device 508 is fully charged, and if not, whether the battery is actually charging. If the portable device 508 is not connected to an external power supply, this test reports the battery's state of charge. All of this information is reported to the user, and it is of considerable value to the user. For example, the user may think that the portable device 508 is connected to an external source of power, but the report may indicate that this is not true. In that case, the user needs to check the external power source for trouble, such as a bent contact pin or a bad connection to a 120 volt AC source or a blown fuse that may be preventing battery charging. Or the user may discover that the battery is not charging at all or is fully discharged. If the user perceives there to be any problems identified at step 414, then at step 416, the user may be offered assistance on how to resolve these problems.

Finally, at step 418, the report 600 (FIG. 6) is displayed to the user. And if all is well, this procedure terminates at step 420. Otherwise, an active chat session can be set up (step 422) to enable a support specialist to guide the user after receiving configuration information for both of the two PCs 506 and 508 as well as a copy of the report 600, possibly supplemented with additional technical information.

C. Brief Description of the Computer Programs

This specification includes, and incorporates by reference, a Compact Disc-Rewritable (CD-R) Program Listing Appendix. The following paragraphs present a description of the five source code computer programs which this CD-R contains.

Please note that to comply with rules of the U.S. Patent and Trademark Office, the names of the five programs were slightly modified: the period "." in each name was changed to an underscore "_", and then the suffix ".txt" was added to the name of each file. Accordingly, the names of the programs on the CD-R appear as follows:

| NAME OF THE PROGRAM | NAME OF FILE ON THE CD-R |
|---|---|
| asyncdiag.cpp | asyncdiag_cpp.txt |
| devcon.cpp | devcon_cpp.txt |
| IPAQSelfHelp.cpp | IPAQSelfHelp_cpp.txt |
| IPAQSelfHelp.fma | IPAQSelfHelp_fma.txt |
| ISPEInfo.cpp | ISPEInfo_cpp.txt |

The source program listing for the selfhelp web program 516 is named "iPAQSelfHelp.fma", and this listing appears in the CD-R as a file named "iPAQSelfHelp_fma.txt". This file is downloaded as an HTML program and is installed within the browser 514 on the host 506, where it controls and places into operation all of the other programs as well as generating the user report 600.

The source program listing for the selfhelp active X control 518 is named "iPAQSelfHelp.cpp", and this listing appears in the CD-R as a file named "iPAQSelfHelp_cpp.txt". This is the active X control which initiates program execution of all the other programs in response to commands received from the selfhelp web program 516.

The source program listing for the check port routine 520 is named "devcon.cpp", and this listing appears in the CD-R as a file named "devcon_cpp.txt". This routine obtains from the operating system device manager 522 information on what accessories are connected to the host 506, returning the results of this inquiry as an XML file at 562 which may, for example, be checked to see if the portable device 508 is registered as attached to the USB port 524.

The source program listing for the gather information program 558 (FIG. 4) that is installed upon the portable device 508 is named "ISPEInfo.cpp", and this listing appears in the CD-R as a file named "ISPEInfo_cpp.txt".

This fourth downloadable file is initially downloaded into the host 506 in object code form as a DLL. If a communications channel between the two PCs is operative, then this DLL executable file transferred from the host 506 to the portable device 508 where it is installed and becomes operational as the gather information program 558 (FIG. 4). The program 558 then can be called upon to gather model information, etc., from the pocket PC and returns it to the calling program on the host 506.

The source program listing which includes the pocket PC API (application programmer interface) routines 536 (FIG. 5) is named "asyncdiag.cpp", and this listing appears in the CD-R Program Listing Appendix as a file named "asyncdiag_cpp.txt". These routines 536 perform many of the low-level functions that are needed to implement the embodiment of the invention described above on a PC such as the host 506 that is running WINDOWS XP and that is communicating with an IPAQ pocket PC running WINDOWS CE. The file that contains these routines is the third of the downloadable files. It is downloaded in the form of an object code Win 32 DLL (Windows 32-bit dynamically-linked library) which is part of the active-X control program, placed into operation by the selfhelp active X control or program 518 as needed.

The API routines 536 are referred to individually by name in the above discussion. Accordingly, the following paragraphs present the name of each individual routine together with a brief explanation of each routine's functions. Also, as an aid to finding the first line of these routines, their first lines are reproduced below following each of these brief explanations. The routines are also called methods or functions. They are invoked by control scripts within the selfhelp web program 516 through the intermediary of the various methods in the selfhelp active X control program 518.

The name of each routine (or method or function) within the set of routines 536, and also the source code for each routine, can be found in the file "asycdiag_cpp.txt". The name of each routine appears in the first line of the source code for that same routine. The routine's name is normally prefixed by "_declspec(dllexport)" followed by a type declaration such as "LPCTSTR". Thus, for example, the first line of the routine "checkCommunication" is: "_declspec (dllexport) LPCTSTR checkCommunication . . . ".

The pocket PC API routines 536 include the following routines or methods or functions (the word "function" is used here):

A function that, when called upon, checks the version of the syncronization program 534 installed on the host 506. This information is obtained from the host 506's registry by means of a call made to the synchronization program 534's callable subroutines. This is to warn the user if the software version is incorrect. Here is the first line of this function:

_declspec(dllexport) LPCTSTR checkActiveSyncInstallation(LPSTR fpath)

A function that checks for the type of partnership that the pocket PC has established with the host 506. This is to warn the user if a standard partnership has not been established (as when a limited-function "guest" relationship, rather than a full-function "partnership" relationship, has been established between the two PCs 506 and 508). This information is obtained directly from the host 506's registry.

_declspec(dllexport) LPCTSTR checkDevicePartnership(LPSTR fpath)
    A function that checks the internal synchronization "event" settings of the synchronization program 534. If this call determines that the program 534 is not internally configured to perform synchronization at regular intervals, this fact is brought to the user's attention as a warning. This information is obtained from the host 506's registry by means of a call made to the synchronization program 534's callable subroutines.

_declspec(dllexport) LPCTSTR checkSyncEventSettings(LPSTR fpath)
    A function that checks the synchronization program 534 to see if the business information manager 532 and 556 program components (such as calendar, notes, etc.) are configured to permit synchronize with the portable device 508. If any component is disabled from synchronizing, this fact is drawn to the attention of the user as a warning. This information is obtained from the host 506's registry by means of a call made to the synchronization program 534's callable subroutines.

_declspec(dllexport) LPCTSTR checkApplicationSyncSettings(LPSTR fpath)
    A function that checks to determine which types of connections between the host 506 and the portable device 508 the synchronization program 534 has been configured to allow. This call determines whether the synchronization program is configured correctly to listen to the USB port 524 or to a particular COM port 528 (COM1, COM2, etc.) or to some form of wireless IR or radio port 538 (IrDA infrared port or TCP/IP radio port or Ethernet port or Bluetooth radio port—note that Bluetooth is not supported by the current version of the synchronization program 534, as implemented using Microsoft's ActiveSync program). This information is obtained from the host 506's registry by means of a call made to the synchronization program 534's callable subroutines.

_declspec(dllexport) LPCTSTR checkConnectionSettings(LPSTR fpath)
    A function that tests out communication between the host 506 and the pocket PC by making probing API function calls to some of what are called the Win CE RAPI (remote access programming interface) functions. These RAPI functions are part of an application programmer's interface (API) that can be used by any host 506-based program to communicate with a pocket PC such as 508 after the two are coupled for bidirectional communication. The host 506 is the client, requesting actions, such as file transfer, or information from the registry or from databases; and the portable device 508 is the server, executing the requested functions and finding and returning the desired information, The CE RAPI functions may be implemented by calls to a DLL named rapi.dll, installed on the host 506; or the program making these calls may be linked directly to RAPI components found in a program library named rapi.lib. CE RAPI functions operate using the winsock (Windows socket) protocol operating over the TCP/IP protocols which are established over whatever path there is for TCP/IP communication between the two computers. This is a method of testing communication between the host 506 and the portable device 508 independant of the synchronization program. CE RAPI function calls may also be used as part of other tests and functions described below.

_declspec(dllexport) LPCTSTR checkCommunication(LPSTR fpath)
    A function that checks out the portable device 508's power supply status by making CE RAPI type calls to Win CE Remote Power Supply APIs.

_declspec(dllexport) LPCTSTR checkPowerSupply(LPSTR fpath)
    A function that obtains the portable device 508's model information, such as its serial number, its WINDOWS CE operating system version, and its BIOS version. This function remotely (from the host 506) places into execution the gather information program 558 on the portable device 508 and commands that program to gather the desired information from the portable device 508 and return it to the host 506.

_declspec(dllexport) LPCTSTR getIPAQModelInfo(LPSTR filepath)
    A function that can transfer a file from the host 506 to the portable device 508 and that is used to inject the gather information program 558 into the portable device 508:

_declspec(dllexport) BOOL copyFileToDevice(LPSTR source, LPCWSTR devicefile)
    A function, used as a fallback function if the above function fails to obtain the portable device 508's model information directly from its BIOS (because there is a failure of communication between the PCs 506 and 508), that obtains this model information from the computer registry of the host 506.

_declspec(dllexport) LPCTSTR getModelInfoFromDesktopReg()
    A function that uses CE RAPI commands to delete any file installed temporarily on the portable device 508 during testing.

_declspec(dllexport) BOOL deleteFileOnDevice(LPWSTR file)
    A function that is invoked to see if the pocket PC is connected to a COM serial port (COM1, COM2, etc., or IrDA Infrared). This function is called upon if the portable device 508 is found not to be registered in the operating system's registry as a "plug and play" device, signifying that the portable device 508 is not connected to the host 506 by means of a USB cable 542. This function first calls upon the API of the synchronization program 534 to learn which COM port 528 (COM1, COM2, etc., or IrDA Infrared) the synchronization program has been configured to use as the serial port 528 for synchronization purposes (if any—other possible configuration choices are USB port and "Network," meaning TCP/IP port—either Ethernet cable or radio). This function then tries to "open" the indicated serial port 528. If the port 528 is reported to be "locked", then the assumption is that it is locked because the synchronization program 534 has taken over the port 528 as a way to communicate with the attached portable device 508. If an attempt made to communicate with the portable device 508 using the CE RAPI commands from the host 506 is successful, the assumption is made that the host 506 and the portable device 508 are properly cabled together, with the port 528 connected by serial cable 540 to the port 546, and thus it is assumed that everything is OK. Of course, in the case of IrDA infrared communication, the connection would be an optical linkage 538 between the ports 530 and 544. (In later versions of the synchronization program 536, Bluetooth may also be treated as another COM port connection option along with COM1, COM2, etc., and IrDA.) But if the designated serial port 528 is found not to be locked, then it is certain that the portable device 508 is not connected to the host 506 by the serial port 528 on the host 506 or by an IrDA interconnection (or, in later possible versions of the software, by a Bluetooth interconnection).

_declspec(dllexport) LPCTSTR checkserialport(LPSTR fpath)

What is claimed is:

1. An automated method using at least one computer program for troubleshooting the potential or actual inability of programs installed upon at least a first and second computer interconnected by linkages to share or manipulate sharable information comprising:
   using at least one program installed on the first computer to perform the steps of:
      (a) testing to see if at least one hardware or software element on the first computer essential to sharing or manipulating sharable information is properly installed or configured or both,
      (b) testing to see if information can actually be sent between the first and second computers, and
      (c) if possible, initiating or performing testing to see if at least one hardware or software element on the second computer essential to sharing or manipulating sharable information is properly installed or configured or both; and
   reporting the results of the testing,
   wherein part (a) further comprises:
      testing information indicating the operative status of at least one software or hardware element installed on the first computer and essential to communications between programs installed on the first and second computers; and
      testing at least one communications permission setting of the first computer to ascertain whether the setting permits a program installed on the second computer to access and to manipulate information on the first computer.

2. The method of claim 1, wherein part (a) further comprises:
   testing information indicating the information sharing configuration of at least one software or hardware element installed on the first computer and essential to communications between programs installed on the first and second computers.

3. The method of claim 2, wherein the information sharing configuration testing ascertains whether the second computer is registered on the first computer as a communicant of the first computer.

4. The method of the claim 3, wherein the linkage is a USB or equivalent protocol wired linkage or an equivalent infrared or radio linkage.

5. The method of the claim 2, wherein the information sharing configuration testing ascertains whether the linkage is reserved by any program.

6. The method of the claim 5, wherein the linkage is a serial port wired linkage or an equivalent infrared or radio linkage.

7. The method of the claim 2, wherein the information sharing configuration testing ascertains whether at least one computer has, or is able to obtain, information indicating directly or indirectly a network address of the other computer.

8. The method of the claim 7, wherein the linkage is an internet protocol or equivalent network linkage.

9. The method of the claim 8, wherein the network linkage is, at least in part, a radio or infrared wireless linkage.

10. The method of claim 1, wherein part (a) further comprises:
    testing information indicating the installation or information sharing configuration or both of at least one given application program.

11. The method of claim 10, wherein the given application program contains a synchronization routine.

12. The method of claim 10, wherein the given application program, installed on the first computer, and another compatible program, installed on the second computer, form a client-server pair.

13. The method of claim 1, wherein part (c) further comprises:
    testing information indicating the operative status of at least one software or hardware element installed on the second computer and essential to communications between programs installed on the first and second computers.

14. The method of claim 1, wherein part (c) further comprises:
    testing information indicating the information sharing configuration of at least one software or hardware element installed on the second computer and essential to communications between programs installed on the first and second computers.

15. The method of claim 1, wherein part (c) further comprises:
    testing information indicating the installation or information sharing configuration or both of at least one given application program.

16. The method of claim 1, wherein part (c) further comprises:
    testing at least one communications permission setting of the second computer to ascertain whether the setting permits a program installed on the first computer to access and to manipulate information on the second computer.

17. A system for troubleshooting the potential or actual inability of programs installed upon at least first and second computers interconnected by a linkage to share or manipulate shared information comprising:
    a self-help program embodied in a computer readable medium and installed on the first computer and comprising:
       a routine that gathers information indicating whether the first computer's programs or data or both are configured to permit information sharing or shared information manipulation,
       a routine that tests communications between the first and second computers over the linkage,
       a routine that gathers information indicating whether the second computer's programs or data or both are configured to permit information sharing or shared information manipulation, and
       a routine that exercises the above routines and then uses information provided by those routines to guide the generation of a troubleshooting report,
    wherein the routine that tests communications between the first and second computers tests information indicating the operative status of at least one software or hardware element installed on the first computer and essential to communications between programs installed on the first and second computers, wherein the self-help program comprises:

a routine to cause the troubleshooting report to be reported external to the first computer, wherein the self-help program causes the first computer to perform the step of uninstalling all troubleshooting programs and data from both machines after performing the performance of the reporting step.

18. The apparatus of claim 17, wherein the linkage is a wired USB or equivalent protocol linkage, and wherein the self-help program further comprises:

a check port routine that determines whether the second computer is registered on the first computer.

19. The apparatus of claim 17, wherein the linkage is a wired serial port linkage or equivalent wireless radio or infrared linkage, and wherein the self-help program further comprises:

a routine that determines whether the serial port linkage or equivalent linkage is reserved by any program.

20. The apparatus of claim 17, wherein the linkage is an internet protocol or equivalent linkage, and wherein the self-help program further comprises:

a routine that determines whether at least one computer has, or is able to obtain, information indicating directly or indirectly a network address of the other computer.

21. The apparatus of claim 20, wherein the linkage is at least partially wireless.

22. An article of manufacture for use in troubleshooting at least two computer's actual or potential inability to share or manipulate shared information over a wired or wireless linkage, the article comprising a computer readable medium having at least one computer program stored thereon that, when installed on a first of the two computers and placed into operation, causes the first computer to perform the steps of:

(a) testing to see if at least one hardware or software element on the first computer essential to sharing or manipulating sharable information is properly installed or configured or both;

(b) testing to see if information can actually be sent between the two computers;

(c) if possible, initiating or performing testing see if at least one hardware or software element on the second computer essential to sharing or manipulating sharable information is properly installed or configured or both; and (d) reporting the results of the tests performed, wherein part (a) further comprises:

testing information indicating the operative status of at least one software or hardware element installed on the first computer and essential to communications between programs installed on the first and second computers, wherein the at least one computer program causes the first computer to perform the step of uninstalling all troubleshooting programs and data from both machines after the performance of the reporting step.

23. An article of manufacture as in claim 22 wherein the storage medium is part of a centralized download service from which the at least one computer program is downloaded onto the first computer from a web site.

24. An article of manufacture for use in troubleshooting at least two computer's actual or potential inability to share or manipulate shared information over a wired or wireless linkage, the article comprising a computer readable medium having at least one computer program stored thereon that, when installed on a first of the two computers and placed into operation, causes the first computer to perform the steps of:

(a) testing to see if at least one hardware or software element on the first computer essential to sharing or manipulating sharable information is properly installed or configured or both;

(b) testing to see if information can actually be sent between the two computers;

(c) if possible, initiating or performing testing see if at least one hardware or software element on the second computer essential to sharing or manipulating sharable information is properly installed or configured or both; and (d) reporting the results of the tests performed, wherein part (a) further comprises:

testing information indicating the operative status of at least one software or hardware element installed on the first computer and essential to communications between programs installed on the first and second computers, wherein the article comprises first and second computer programs stored on the storage medium, both downloadable into the first computer, wherein the first program performs the steps (a) and (b), and wherein the first program causes the transfer of the second program across the linkage to the second computer where the second program performs the step (c).

25. An article of manufacture as in claim 24 wherein the at least one computer program causes the first computer to perform the step of uninstalling all troubleshooting programs and data from both machines after performing the performance of the reporting step.

26. A system embodied in computer readable medium for troubleshooting the potential or actual inability of programs installed upon at least first and second computers interconnected by a linkage to share or manipulate shared information comprising:

self-help means for troubleshooting installed on the first computer for execution by the first computer and comprising:

means for gathering information indicating whether the first computer's programs or data or both are configured to permit information sharing or shared information manipulation, means for testing communications between the first and second computers over the linkage, means for gathering information indicating whether the second computer's programs or data or both are configured to permit information sharing or shared information manipulation, and means for exercising the above means and then for using information provided by those means to guide the generation of a troubleshooting report, wherein the means for testing communications between the first and second computers tests information indicating the operative status of at least one software or hardware element installed on the first computer and essential to communications between programs installed on the first and second computers, wherein the self-help program comprises:

means for causing the troubleshooting report to be reported external to the first computer, wherein the self-help program causes the first computer to uninstall all troubleshooting programs and data from both machines after the troubleshooting report has been reported.

27. An automated method using at least one computer program for troubleshooting the potential or actual inability of programs installed upon at least a first and second computer interconnected by linkages to share or manipulate sharable information comprising:

using at least one program installed on the first computer to perform the steps of:
- (a) testing to see if at least one hardware or software element on the first computer essential to sharing or manipulating sharable information is properly installed or configured or both,
- (b) testing to see if information can actually be sent between the first and second computers, and
- (c) if possible, initiating or performing testing to see if at least one hardware or software element on the second computer essential to sharing or manipulating sharable information is properly installed or configured or both; and reporting the results of the testing, wherein part (a) further comprises:

testing information indicating the operative status of at least one software or hardware element installed on the first computer and essential to communications between programs installed on the first and second computers, wherein the at least one program causes the first computer to perform the step of uninstalling all troubleshooting programs and data from both machines after performing the performance of the reporting step.

* * * * *